United States Patent
Graffin

(10) Patent No.: US 6,692,050 B2
(45) Date of Patent: Feb. 17, 2004

(54) RECEPTACLE-GRIPPING CLAMP

(75) Inventor: André Graffin, Kuala Lumpur (MY)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 10/140,872

(22) Filed: May 9, 2002

(65) Prior Publication Data

US 2002/0167185 A1 Nov. 14, 2002

(30) Foreign Application Priority Data

May 9, 2001 (FR) .............................. 01 06108
Sep. 18, 2001 (FR) .............................. 01 12042

(51) Int. Cl.[7] .............................................. B65G 47/86
(52) U.S. Cl. ..................... 294/104; 198/803.7; 294/116
(58) Field of Search ................................ 294/104, 116, 294/28, 30, 31.1; 198/803.3, 803.7, 803.9, 803.14

(56) References Cited

U.S. PATENT DOCUMENTS

| | | | | |
|---|---|---|---|---|
| 1,190,581 A | * | 7/1916 | Pfeninger | 294/28 |
| 1,728,418 A | * | 9/1929 | Litchfield | 81/3.36 |
| 3,232,657 A | * | 2/1966 | Thompson et al. | 294/31.1 |
| 3,863,753 A | * | 2/1975 | Shank, Jr. | 198/680 |
| 4,468,277 A | * | 8/1984 | Kontz | 156/567 |
| 4,591,046 A | | 5/1986 | Toste, Jr. et al. | |
| 5,693,113 A | * | 12/1997 | Dries et al. | 65/260 |
| 6,079,541 A | * | 6/2000 | Bercelli et al. | 198/377.03 |

FOREIGN PATENT DOCUMENTS

| | | |
|---|---|---|
| EP | 0 451 670 A1 | 10/1991 |
| EP | 0 480 585 A2 | 4/1992 |
| FR | 2 785 271 | 5/2000 |

* cited by examiner

Primary Examiner—Dean J. Kramer
(74) Attorney, Agent, or Firm—Birch, Stewart, Kolasch & Birch, LLP

(57) ABSTRACT

The invention relates to a gripping clamp for receptacles, each comprising a body and a neck having a projecting collar presenting a substantially radial bearing face beside the body, the clamp having first and second jaws, the first jaw being arranged to co-operate with the bearing face of the collar and the second jaw being arranged to co-operate with a zone of the neck that extends in the vicinity of the bearing face on its side facing away from the body, when the clamp is in a closed, gripping position.

8 Claims, 4 Drawing Sheets

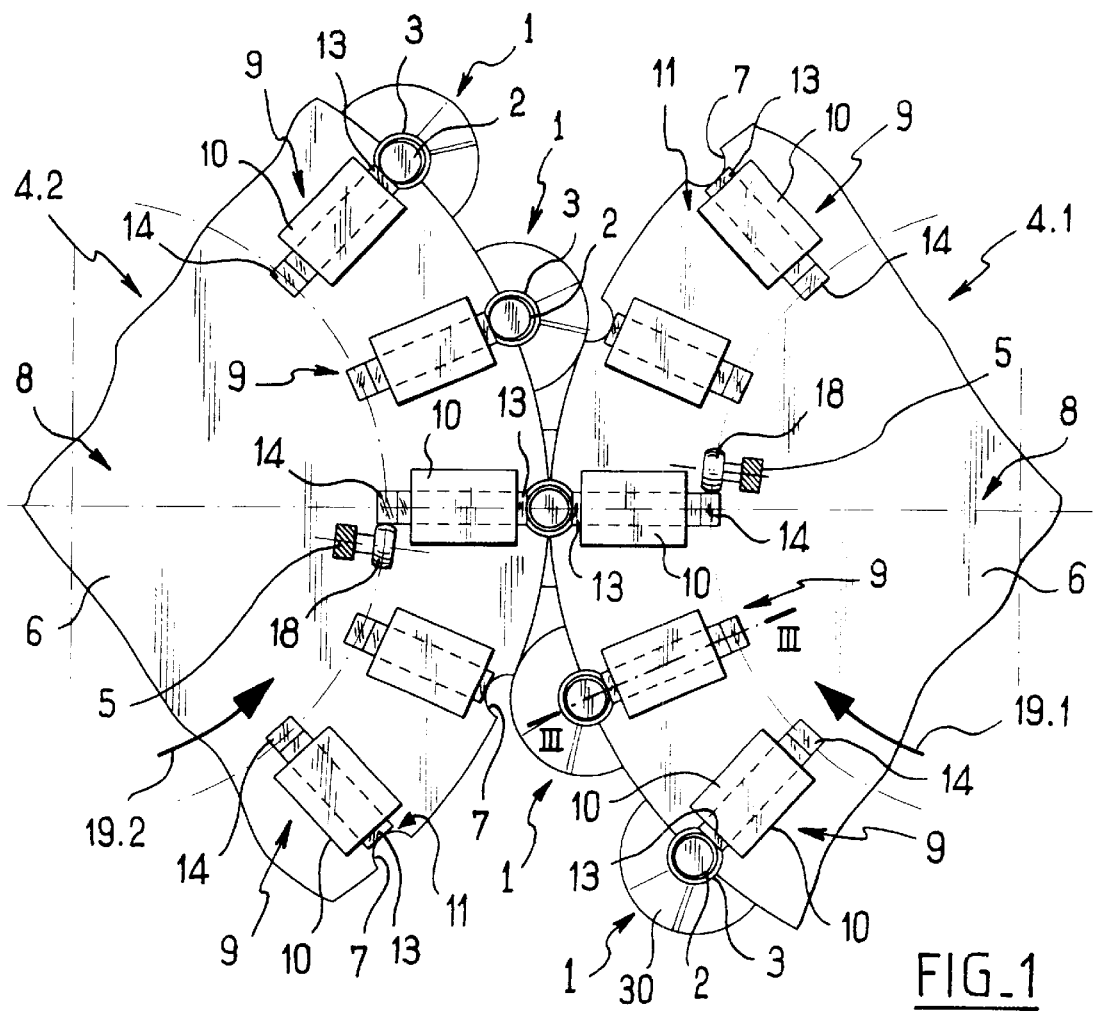
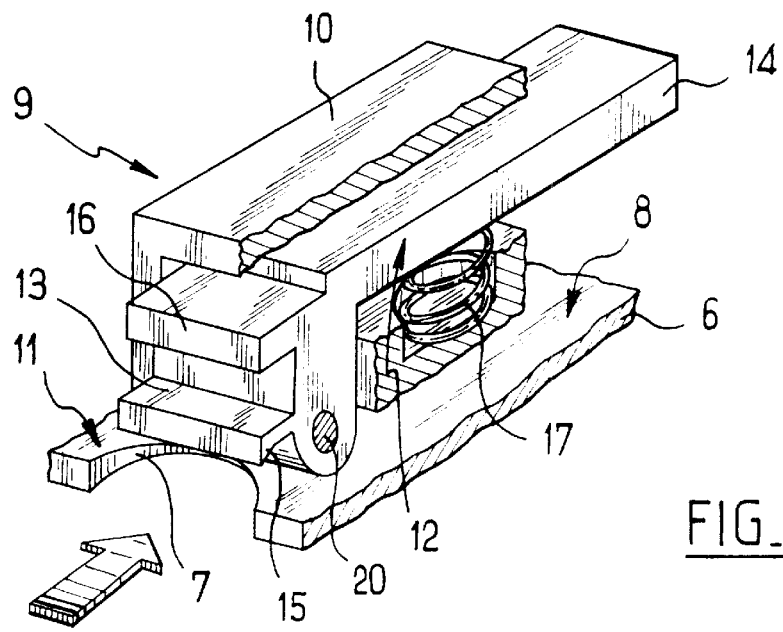

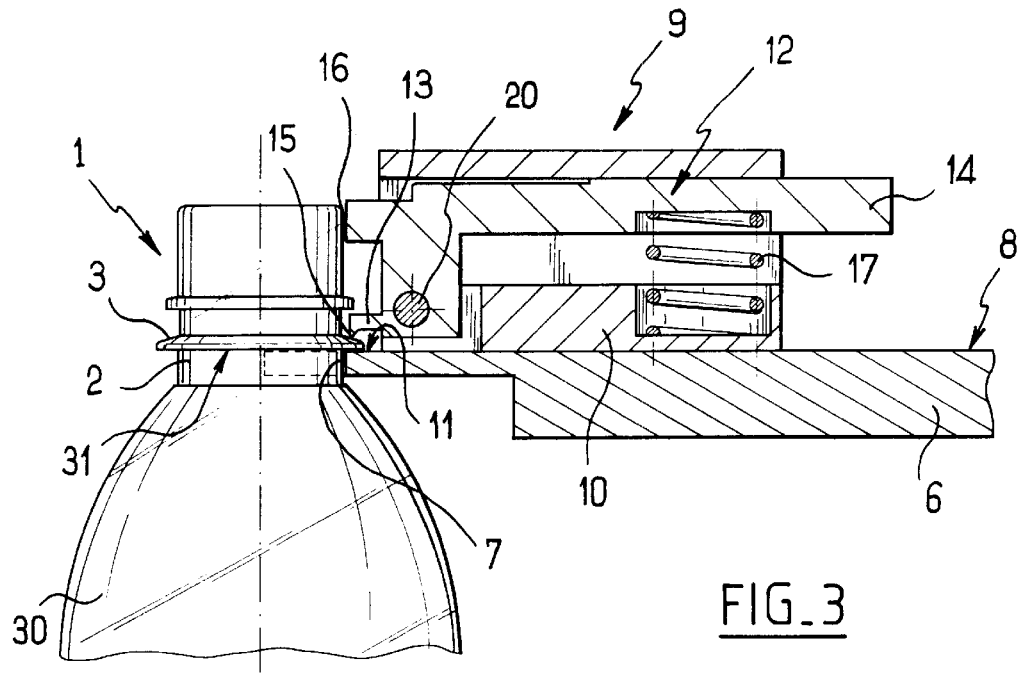
FIG_3
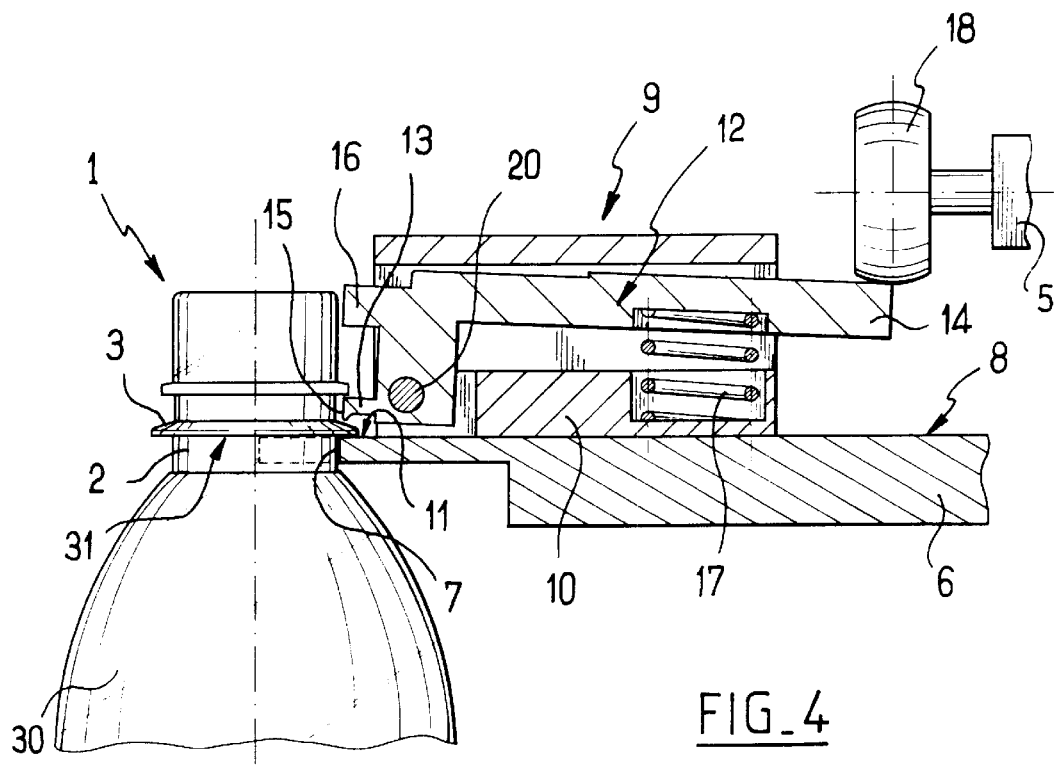
FIG_4

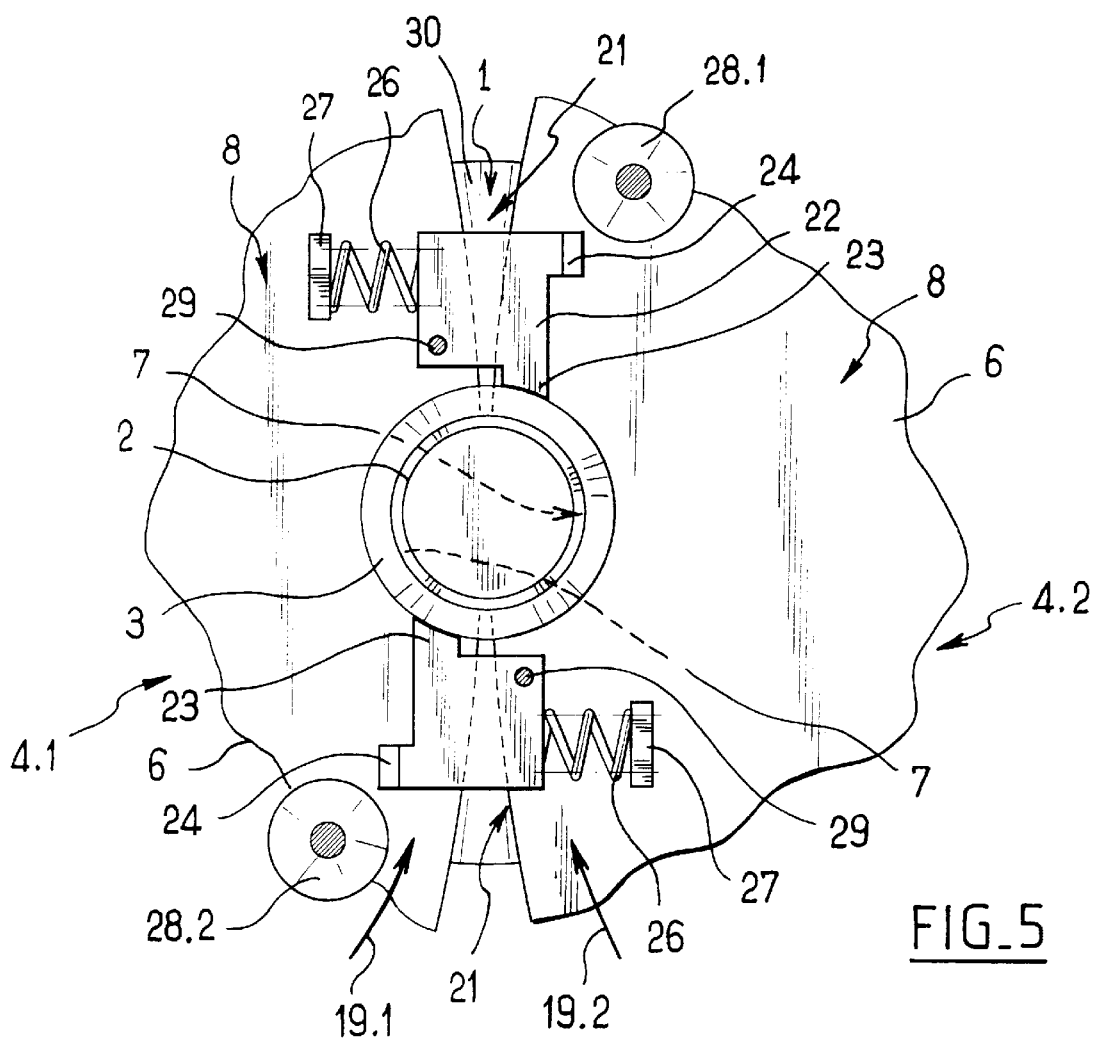
FIG_5
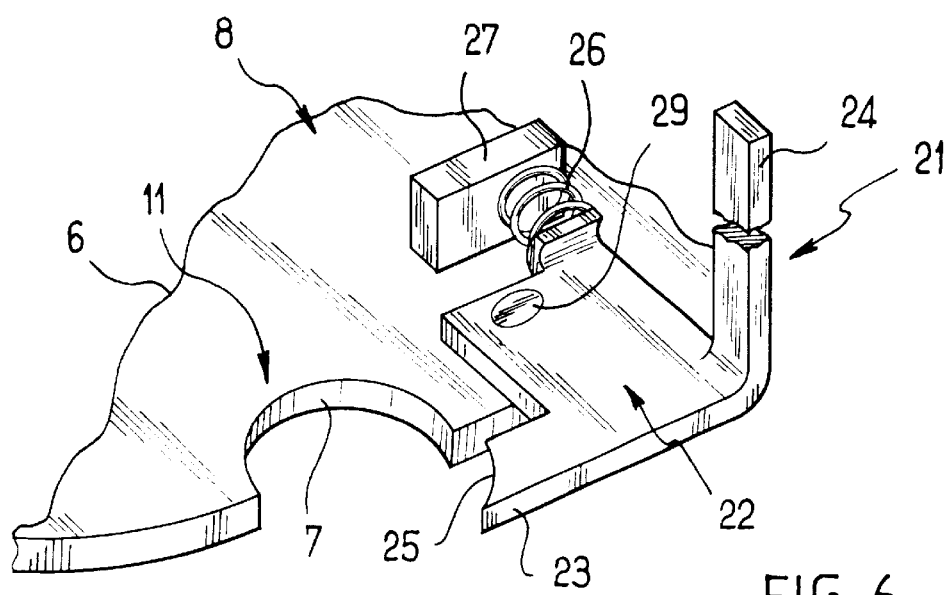
FIG_6

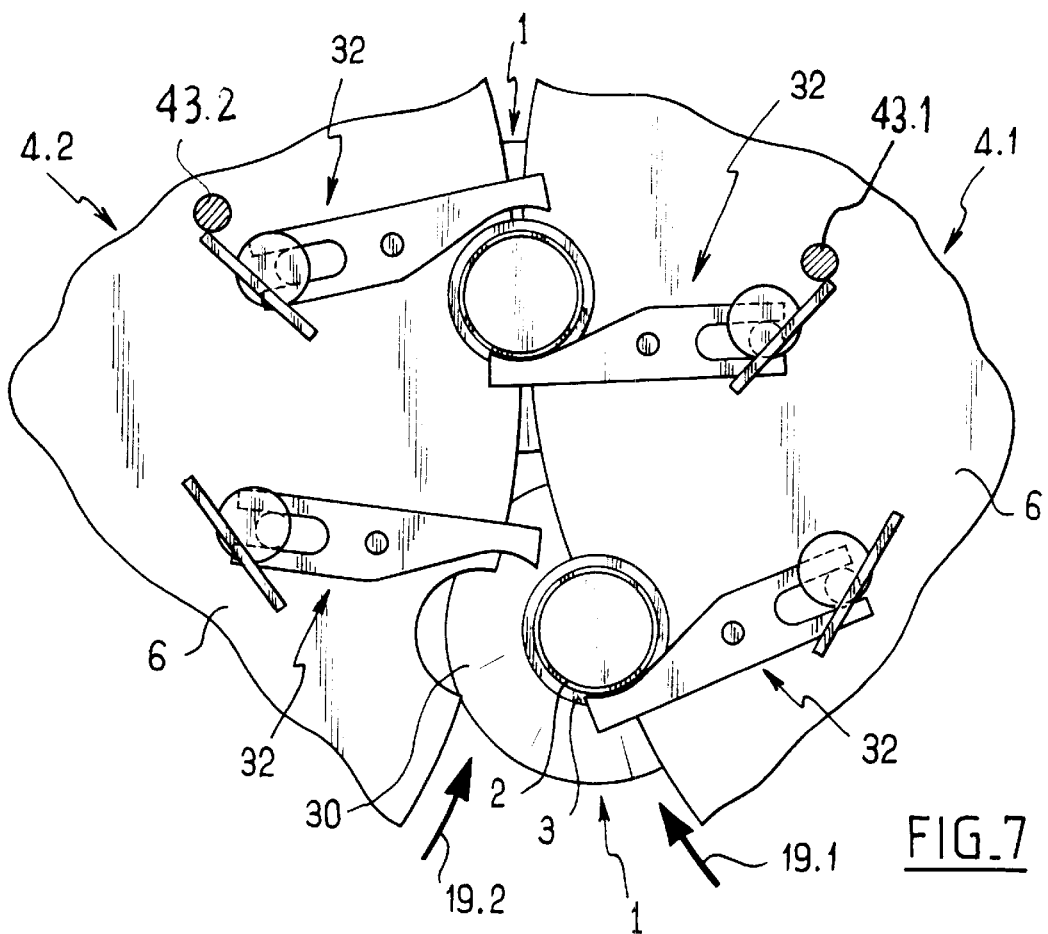
FIG_7
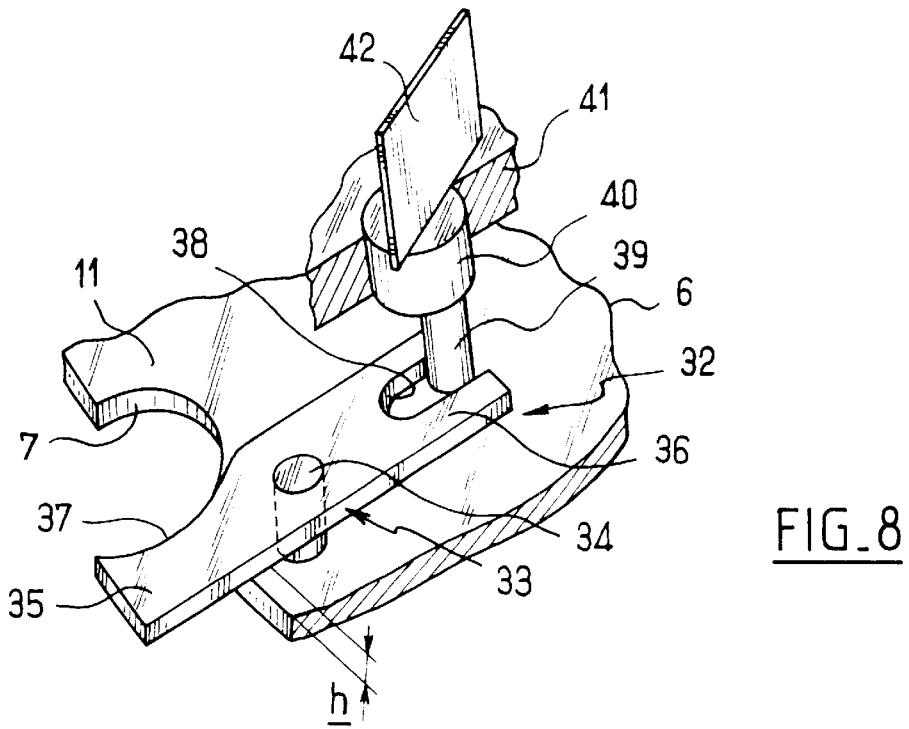
FIG_8

RECEPTACLE-GRIPPING CLAMP

The present invention relates to a clamp for gripping receptacles each having a neck provided with a projecting collar. Devices of this type are suitable for use, for example, in receptacle transporters such as transporter stars of the kind used in particular in installations for filling such receptacles.

BACKGROUND OF THE INVENTION

A star is generally constituted by a rotary platform having a peripheral portion in which notches or slots are formed. Each notch opens out laterally to receive a portion of the neck in such a manner that the collar rests on a portion of the top surface of the platform adjacent to the edge of the notch. The necks are held in the notches by a rail which extends around the platform so as to prevent the necks from leaving the notches. Nevertheless, there is a risk of a receptacle becoming wedged between the rail and the platform, giving rise to jamming. The rail then needs to be dismantled in order to enable the wedged receptacles to be removed. Such action is relatively lengthy and requires the installation to be stopped beforehand. In addition, a further drawback of such stars lies in the fact that at high rates of throughput the amount of centrifugal force acting on the receptacles tends to cause them to tilt and thus runs the risk of causing accidents, such as the jamming as described above, while receptacles are being transferred from one star to another.

In another type of transporter star, the rotary platform is fitted at its periphery with clamps each comprising two jaws which are connected to each other by a hinge pin extending parallel to the axis of rotation of the platform, and which are arranged to take hold of the receptacle via its neck, either above or below the collar. That solution avoids the above-mentioned drawbacks but is complex and relatively expensive.

OBJECTS AND SUMMARY OF THE INVENTION

An object of the invention is to make it possible in simple and relatively inexpensive manner to grip receptacles each comprising a body and a neck having a projecting collar presenting a bearing face that extends substantially radially on its face looking towards the body.

According to the invention, this object is achieved by a clamp for gripping such receptacles, the clamp comprising first and second jaws, the first jaw being arranged to co-operate with the bearing face of the collar and the second jaw being arranged to co-operate with a zone of the neck that extends adjacent to the bearing face, and on the side thereof that is remote from the body when the clamp is in its closed, gripping position.

The receptacle is thus held by the first jaw acting on the bearing face of the collar and the second jaw acting on the portion of the neck that is above the bearing face. The clamp can be simple in structure, and when the gripping clamp is mounted on a platform, there is no need to make use of an outer rail for holding the receptacles on the platform. In addition, with this structure receptacles can be transferred simply between two platforms.

Preferably, the first jaw comprises a collar abutment secured to a structural member, and the second jaw comprises a holding element mounted to move relative to the structural member to exert pressure on said zone of the neck in such a manner as to hold the collar in position against the abutment.

Advantageously, the clamp includes a support member having a substantially horizontal face forming the abutment, the support member preferably having a laterally open notch for receiving a portion of the neck adjacent to the collar.

The abutment then presents a relatively large area for co-operating with the bearing face of the collar, and the edge of the notch can also serve to position the neck laterally.

In a particular embodiment, the holding element is mounted relative to the support member to pivot about a hinge pin which is substantially perpendicular to the face of the abutment and has an end adjacent to the notch to bear laterally against the collar in such a manner as to hold the neck in the notch.

The holding element then serves to hold the neck in the notch, and the bearing face of the collar against the abutment face without occupying the zone that extends above the collar. This structure is particularly advantageous for use on a platform for screwing on screw caps, since the gripping clamp can then be arranged in such a manner as to avoid interfering with the movements of the screw-tightening shank. In addition, since the dimensions of the collar are common for a variety of receptacle sizes, holding by means of the collar present the advantage of enabling receptacles of different sizes to be gripped without modifying the clamp.

Advantageously, the holding element has at least one tooth arranged to bite into the collar.

The holding element thus ensures that the collar is gripped firmly.

According to another advantageous characteristic, the clamp has a member for bearing laterally against a portion of the neck, which bearing member is spaced apart from the abutment.

BRIEF DESCRIPTION OF THE DRAWINGS

Other characteristics and advantages of the invention appear in the following description of particular, non-limiting embodiments of the invention.

Reference is made to the accompanying drawings, in which:

FIG. 1 is a fragmentary diagrammatic plan view of a filling installation including gripping clamps constituting a first embodiment of the invention;

FIG. 2 is a perspective view of one of the FIG. 1 clamps;

FIG. 3 is a fragmentary section view on line III—III of FIG. 1 showing the gripping clamp in its closed, receptacle-holding position;

FIG. 4 is a view analogous to FIG. 3 showing the gripping clamp in its open, receptacle-releasing position;

FIG. 5 is a fragmentary diagrammatic plan view showing a filling installation provided with gripping clamps constituting a second embodiment of the invention;

FIG. 6 is a perspective view of one of the FIG. 5 clamps;

FIG. 7 is a fragmentary diagrammatic plan view showing a filling installation provided with gripping clamps constituting a third embodiment of the invention; and FIG. 8 is a perspective view of one of the FIG. 7 clamps.

MORE DETAILED DESCRIPTION

The gripping clamp of the invention is for use with receptacles given overall reference 1 each comprising a body 30 and a neck 2 having a projecting collar 3. Facing towards the body 30, the collar 3 presents a substantially radial bearing face 31 (visible in FIGS. 3 and 4).

With reference to the figures, gripping clamps constituting three embodiments of the invention are described herein in an application to a filling installation comprising two platforms, namely an upstream platform and a downstream platform respectively referenced 4.1 and 4.2 in order to distinguish between them, which platforms are tangential to each other and are mounted to turn relative to a frame 5 (visible in FIGS. 1 and 4) by rotating in opposite directions marked in FIGS. 1, 5, and 7 by arrows referenced 19.1 and 19.2 respectively.

Each platform 4 comprises a disk-shaped horizontal plate 6 having outwardly-open notches 7 in its periphery. Each notch 7 is semicircular in shape having a radius greater than the radius of the neck 2 and less than the radius of the collar 3.

The plate 6 has a top surface 8 with gripping clamps mounted on a peripheral portion thereof, each clamp being disposed in the vicinity of a corresponding notch 7.

In the first embodiment, and with reference to FIGS. 1 to 4, each gripping clamp given overall reference 9 comprises a structural member 10 fixed on the top surface 8 of the plate 6, an abutment 11 secured to the structural member 10, and a holding element generally referenced 12 and mounted to move relative to the structural member 10.

In this case, the abutment 11 is formed by the portion of the top surface 8 of the plate 6 which is adjacent to the corresponding notch 7.

The holding element 12 is a jaw having one end that forms a grip 13 extending over the abutment 11, and an opposite end forming an actuator portion 14. The grip 13 has a tooth 15 projecting towards the abutment 11. In this case, the tooth 15 constitutes a sharp edge.

The holding element 12 also has a lateral thrust member 16 disposed above the grip 13 and spaced apart from the abutment 11.

The holding element 12 is mounted on the structural member 10 about a horizontal hinge pin 20 placed between the ends of the holding element 12 so as to enable it to pivot between an open position (shown in FIG. 4) in which the tooth 15 is spaced apart from the abutment 11 by a distance that is greater than the thickness of the collar 3, and a closed position (shown in FIG. 3) in which the tooth 15 is moved closer to the abutment 11 so as to lie at a distance therefrom that is less than the thickness of the collar 3. A spring 17 is interposed between the structural member 10 and the holding element 12 to urge it towards its closed position.

The filling installation also has respective actuator wheels 18 mounted in fixed positions on the frame 5 over each of the platforms 4 on the paths followed by the actuator portions 14 of the holding element 12 so that during rotation of the platforms the actuator wheels cause each holding element 12 to pivot into its open position against the force exerted by its spring 17.

The actuator wheel 18 of the downstream platform 4.2 is located upstream from the point where the platforms 4 are tangential to each other, referred to below as the "tangent point", while the actuator wheel 18 of the upstream platform 4.1 is located downstream from said point, with "upstream" and "downstream" being relative to the respective directions of rotation of the platforms.

There follows a description of a receptacle 1 being transferred from the upstream platform 4.1 to the downstream platform 4.2.

The neck 2 of the receptacle 1 is received in a notch 7 of the upstream platform 4.1 and the bearing surface 31 of its collar 3 is pressed against the abutment 11 by the holding element 12, which is urged towards its closed position by the spring 17. The collar 3 is thus clamped between the abutment 11 and the grip 13 whose tooth 15 is pressed into the collar 3. The portion of the neck 2 that extends above the collar 3 then bears against the lateral thrust member 16 which opposes the effect of centrifugal force exerted on the receptacle 1 by the rotation which is imparted thereto by the platform 4.1 The amount of tilt that centrifugal force imparts to the receptacle is thus limited.

Rotation of the platforms 4 is synchronized in such a manner that the notch 7 of the upstream platform 4.1 receiving the receptacle 1 comes into register with an empty corresponding notch 7 of the downstream platform 4.2 at the tangent point between the platforms 4.

During this rotation, on the downstream platform 4.2, the actuator portion 14 of the gripping clamp 9 adjacent to the empty notch 7 coming up to the tangential point encounters the actuator wheel 18. This actuator wheel 18 then brings the holding element 12 into its open position so as to enable the collar 3 of the receptacle 1 carried by the upstream platform 4.1 to be inserted between the abutment 11 and the grip 13 of said holding element 12. When the actuator wheel 18 leaves the actuator portion 14, the spring 17 returns the holding element 12 to its closed position. The receptacle 1 is thus held in the gripping clamp 9 of the downstream platform 4.2: the holding element 12 presses the collar 3 against the abutment 11 and the tooth 15 bites into the collar 3.

At the tangent point, the neck 2 of the receptacle 1 is received in both facing notches 7 and the collar 3 of the receptacle 1 is clamped by the facing gripping clamps 9.

Downstream from the tangent point, on the upstream platform 4.1, the actuator portion 14 of the holding element 12 of the gripping clamp 9 meets the actuator wheel 18 which brings the holding element 12 into its open position, thereby releasing the collar 3.

As rotation continues, the receptacle 1 leaves the upstream platform 4.1 and is then supported solely by the downstream platform 4.2.

This provides a method of conveying receptacles including a receptacle-gripping step associated with a receptacle-moving step, gripping being achieved by clamping the collar. The collar is then used both for keeping the packages vertical and for holding them radially in the conveyor plane. This gripping technique is particularly simple. In addition, in order to transfer the receptacle from the upstream platform to the downstream platform, gripping is implemented on two opposite points of the collar, thereby simplifying the installation.

In the second embodiment shown in FIGS. 5 and 6, each gripping clamp given overall reference 21 comprises an abutment 11 formed as above by a portion of the top surface 8 of the plate 6 adjacent to the notch 7, and a holding element 22 mounted on the top surface 8 of the plate 6 (which then forms the structural member of the gripping clamp) in the vicinity of the notch 7 by means of a hinge pin 29 extending perpendicularly to said surface to pivot between an open position and a closed position.

The holding element 22 comprises a portion projecting beyond the platform 4 which possesses both a grip 23 and, opposite from the grip, an actuator upright 24 extending substantially perpendicularly to the plate 6.

The grip 23 possesses a circularly arcuate concave face 25 of radius equal to that of the collar 3.

A spring 26 is mounted between the holding element 22 remote from the grip 23 and an abutment 27 projecting from the plate 6 so as to urge the holding element 22 resiliently into its closed position.

The gripping clamps 21 are mounted downstream from the notches 7 on the upstream platform 4.1 and upstream from the notches 7 of the downstream platform 4.2 relative to their respective directions of rotation.

The filling installation also comprises actuator wheels 28.1 and 28.2 mounted in fixed positions on the frame above the platforms 4.2 and 4.1 respectively on the paths of the actuator uprights 24 of the holding elements 22 so that during rotation of the platforms they cause the holding elements to pivot towards their open positions against the force exerted by their springs 26.

The actuator wheel 28.2 for engaging the downstream platform 4.2 is thus located above the upstream platform 4.1 upstream from the tangent point between the platforms 4, while the actuator wheel 28.1 for the upstream platform 4.1 is placed over the downstream platform 4.2 downstream from said tangent point relative to the respective directions of rotation of the platforms.

A receptacle 1 is transferred from the upstream platform 4.1 to the downstream platform 4.2 as described below.

The neck 2 of the receptacle 1 is received in a notch 7 of the upstream platform 4.1 and the bearing face 31 of the collar 3 rests on the abutment 11. The holding element 22 which is urged towards its closed position by the spring 26 acts on the collar 3 via the face 25 of the grip 23, urging it towards an opposite portion of the edge of the notch 7. Lateral pressure is thus applied to the collar which tends to hold the neck 2 pressed against the edge of the notch 7, and thus holds the bearing face 31 of the collar 3 in position against the abutment 11.

Rotation of the platforms 4 is synchronized so that the notch 7 of the upstream platform 4.1 which receives the receptacle 1 comes into register with an empty corresponding notch 7 of the downstream platform 4.2 at the tangent point between the platforms 4.

During this rotation, the actuation upright 24 of the gripping clamp 21 adjacent to the empty notch 7 that is coming up to the tangent point meets the actuator wheel 28.2. The actuator wheel 28.2 then moves the holding element 22 into its open position in which the grip 23 is spaced apart from the edge of the notch 7 by a distance which is sufficient to enable the collar 3 of the receptacle 1 carried by the upstream platform 4.1 to be inserted therein. When the actuator upright 24 leaves the actuator wheel 28.2, the spring 26 returns the holding element 22 to its closed position. The receptacle 1 is thus held in the gripping clamp 21 of the downstream platform 4.2 by the holding element 22 in its closed position.

At the tangent point, the neck 2 of the receptacle 1 is received in both of the facing notches 7, and the collar 3 of the receptacle 1 is clamped by both facing gripping clamps 21. It will be observed that since the holding elements 22 are pressed in one case against the downstream portion of the collar and in the other case against the upstream portion thereof, these holding elements 22 can extend over the platform facing the platform on which they are mounted without interfering with each other.

Downstream from the tangent point, the actuator portion 24 of the holding element 22 of the gripping clamp 21 of the upstream platform 4.1 meets the actuator wheel 28.1 which brings the holding element 22 into its open position, and releases the collar 3.

As rotation continues, the receptacle 1 leaves the upstream platform 4.1 and is then supported only by the downstream platform 4.2. When the actuator upright 24 leaves the actuator wheel 28.1, the spring 26 returns the holding element 22 into its closed position.

In the third embodiment, and with reference to FIGS. 7 and 8, each gripping clamp given overall reference 32 comprises an abutment 11 formed as above by a portion of the top surface 8 of the plate 6 adjacent to the notch 7, and a holding element 33 pivotally mounted on the top surface 8 of the plate 6 (which then forms the structural member of the gripping clamp) in the vicinity of the notch 7 on a hinge pin 34 extending perpendicularly to said surface, so as to pivot between an open position (visible in FIG. 7 for the clamps 32 on the platform 4.2) and a closed position (visible in FIG. 7 for the clamps 32 secured to the platform 4.1).

The holding element 33 comprises a portion that projects beyond the platform 4 and that possesses a grip 35, while at its opposite end it possesses an actuator portion 36.

The grip 35 is situated relative to the abutment 11 at a height h that is greater than the thickness of the collar 3, and it possesses a circularly arcuate concave face 37 of radius equal to the radius of the portion of the neck 2 that extends immediately above the collar 3.

The actuator portion 36 has an oblong slot 38 receiving a finger 39 that can slide along its edges, which finger is secured eccentrically to a disk 40 mounted to pivot about a substantially vertical axis in a support 41 fixed on the plate 6. A vertical flap 42 is itself mounted eccentrically on the disk 40 on its face opposite to the face on which the finger 39 is mounted.

The gripping clamps 32 are mounted upstream from the corresponding notches 7 on the upstream platform 4.1 and downstream from the corresponding notches 7 on the downstream platform 4.2, relative to the respective directions of rotation 19.1 and 19.2 thereof.

The filling installation also comprises actuator wheels 43 mounted in fixed positions on the frame above the platforms 4.1 and 4.2 respectively on the paths of the flaps 42 of the holding elements 33 in such a manner that during rotation of the platforms, the holding elements 33 are caused to move between their open and closed positions. Each actuator wheel 43 is mounted to meet the flaps 42 in such a manner as to cause the disk 40 to pivot. The pivoting of each disk 40 causes the finger 39 to move along a circularly arcuate path suitable for causing the holding element 33 to pivot about its hinge pin 34 from one of its positions to the other.

The actuator wheels 43.1 and 43.2 can be seen in FIG. 7.

The actuator wheel 43.1 is thus located above the upstream platform 4.1 substantially level with the tangent point between the platforms 4 so as to bring the holding elements 33 that are secured to the upstream platform 4.1 from their closed positions to their open positions when level with the tangent point, while the actuator wheel 43.2 is located above the downstream platform 4.2 slightly downstream from the tangent point relative to the respective directions of rotation of the platforms so as to bring the holding elements 33 that are secured to the downstream platform 4.2 from their open positions to their closed positions.

Another actuator wheel 43 (not shown) is placed over the upstream platform 4.1 so as to bring the holding elements 33 secured to the upstream platform 4.1 from their open positions to their closed positions, and another actuator wheel 43 (not shown) is disposed over the downstream platform 4.2 so as to bring the holding elements 33 secured to the downstream platform 4.2 from their closed positions to their open positions.

A receptacle 1 is transferred from the upstream platform 4.1 to the downstream platform 4.2 as described below.

The neck 2 of the receptacle 1 is received in a notch 7 of the upstream platform 4.1 and the bearing face 31 of the collar 3 rests on the abutment 11. The holding element 33 in the closed position exerts a force on the neck 2 above the collar 3 via the face 37 of the grip 35, which force acts towards an opposite portion of the edge of the notch 7. Lateral pressure is thus applied to the neck 2 tending to hold the neck 2 pressed against the edge of the notch 7 and consequently to hold the bearing face 31 of the collar 3 in position on the abutment 11.

Rotation of the platforms 4 is synchronized so that the notch 7 of the upstream platform 4.1 which holds the receptacle 1 comes into register with an empty corresponding notch 7 of the downstream platform 4.2 at the tangent point of the platforms 4.

At the tangent point, the neck 2 of the receptacle 1 is received in both of the facing notches 7 and the collar 3 of the receptacle 1 is clamped by both facing gripping clamps 32.

During rotation, the flap 42 of the holding element 33 of the gripping clamp 32 of the upstream platform 4.1 meets the actuator wheel 43.1 which brings the holding element 33 into its open position, thereby releasing the neck 2. The flap 42 of the corresponding gripping clamp 32 of the downstream platform 4.2 meets the actuator wheel 43.2 which brings the holding element 33 into its closed position in which the grip 35 is moved towards the edge of the notch 7 so as to hold captive the neck 2 of the receptacle 1 carried by the downstream platform 4.1. The receptacle 1 is then held in the gripping clamp 32 of the downstream platform 4.2 by the holding element 33 in its closed position.

As rotation continues, the receptacle 1 leaves the upstream platform 4.1 and is then supported only by the downstream platform 4.2.

Naturally, the invention is not limited to the embodiments described and various embodiments can be devised without thereby going beyond the ambit of the invention as defined by the claims.

In particular, the invention is not limited to the described application and it can be used in particular for any device that conveys a receptacle.

A gripping device of the invention can also be obtained by inverting the above-described structures, and more particularly the structure of the first embodiment. It can then be observed that when the tooth marks the collar 3, the mark in question is on the underside of the collar 3 in its bearing face, and is therefore not visible.

Other means for actuating the gripping clamp can be envisaged, such as means that are pneumatic or hydraulic, cams, . . . .

In addition, the notches can be of shapes other than those described, and in particular they can be triangular in shape so as to form positioning V-grooves, or indeed the edge of the plate whose top face forms the abutment need not have any notches at all.

The gripping clamps of the first embodiment can be placed equally well on the platforms to clamp against the upstream portion or the downstream portion of the collar relative to its travel direction. In general, and in any of the embodiments, the gripping clamps can be mounted in different ways on the platforms, for example they can be cantilevered.

Although the abutment 11 is formed in this case by the portion of the top surface 8 of the plate 6 which is adjacent to the corresponding notch 7, the abutment 11 could be made differently, and in particular it could be fitted onto the plate 6.

The grip and/or the abutment can be smooth or they can present serrations so as to grip the collars better.

In some installations, it is possible to use a platform fitted with clamps constituting the second embodiment in association with a platform fitted with clamps constituting the third embodiment, for example, or indeed the first embodiment.

Although the clamps are caused to move between their open and closed positions in the embodiment described by positive actuator means (wheel 18 and actuator portion 14; wheel 28 and upright 24; wheel 43 and eccentric finger 39), a clamp can be held closed by a spring in such a manner that the receptacles are inserted between and/or extracted from the grips by force. The actuator means can also be of different structure. The holding element can be associated, for example, with a wheel that runs on a camming surface that is fixed relative to the frame 5.

What is claimed is:

1. A transporter for receptacles, each of said receptacles comprising a body and a neck having a projecting collar presenting a substantially radial bearing face beside the body, said transporter comprising an upstream rotating platform, a downstream rotating platform tangential to the upstream rotating platform and at least two support members respectively fixed with respect to the upstream rotating platform and with respect to the downstream rotating platform, each support member having a laterally-open notch to receive a receptacle neck portion extending below the collar and an abutment to cooperate with the bearing face of the collar, a jaw being hinged on each support between a closed gripping position and an open position, the platform being synchronized in such a manner that at a tangent point between the platforms a notch of a support member fixed with respect to the upstream rotating platform comes into register with a notch of a support member of the downstream rotating platform in order to transfer a receptacle from the upstream rotating platform to the downstream rotating platform, the jaws being positioned so that in the closed gripping position the jaws mounted on the upstream rotating platform and the downstream rotating platform bear against opposite sides of the neck of the receptacle received in the notches in register.

2. A transporter according to claim 1, wherein a jaw in the closed gripping position is arranged to co-operate with a zone of the neck that extends above the bearing face and in the vicinity of the bearing face.

3. A transporter according to claim 2, wherein the jaw is mounted to move relative to the support member to exert pressure on said zone of the neck in such a manner as to hold the collar in position against the abutment.

4. A transporter according to claim 3, wherein the jaw has at least one tooth arranged to bite into the collar.

5. A transporter according to claim 2, wherein the jaw is mounted relative to the support member to pivot about a hinge pin which is substantially perpendicular to the face of the abutment and has an end adjacent to the notch to bear laterally against the collar in such a manner as to hold the neck in the notch.

6. A transporter according to claim 2, wherein the jaw is mounted to pivot relative to the support member about a hinge pin substantially perpendicular to the abutment face and has an end spaced apart from the support member and adjacent to the notch to bear laterally against the neck above the collar so as to hold the neck in the notch.

7. A transporter according to claim 2, including a spring inserted between the support member and the jaw to urge the holding element against said zone of the neck.

8. A transporter according to claim 1, wherein the support members are integral with the platforms.

* * * * *